United States Patent
Archibald

[11] 3,905,961
[45] Sept. 16, 1975

[54] THIAZOLE PENICILLINS

[75] Inventor: John Leheup Archibald, Windsor, England

[73] Assignee: John Wyeth & Brother Limited, Maidenhead, England

[22] Filed: Jan. 19, 1973

[21] Appl. No.: 324,915

Related U.S. Application Data

[63] Continuation of Ser. No. 1,019, Jan. 6, 1970.

[30] Foreign Application Priority Data
Jan. 7, 1969  United Kingdom.................. 924/69
Jan. 7, 1969  United Kingdom.................. 925/69

[52] U.S. Cl................................ 260/239.1; 424/271
[51] Int. Cl.[2]........................................ C07D 499/46
[58] Field of Search................................ 260/239.1

[56] References Cited
UNITED STATES PATENTS 3,574,799  4/1971  Bamberg et al.................. 260/239.1
3,609,141  9/1971  Fujisawa........................ 260/239.1
3,728,333  4/1973  Panina et al.................... 260/239.1

*Primary Examiner*—Nicholas S. Rizzo
*Attorney, Agent, or Firm*—Joseph Martin Weigman

[57] ABSTRACT

Acylation of 6-aminopenicillanic acid with oxazole or thiazole compounds of formula

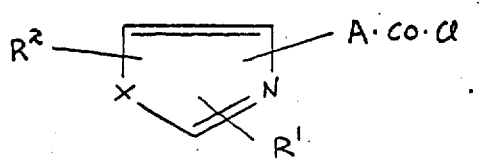

in which A is an ethylene or a trimethylene radical, $R^1$ is an aryl radical or a cycloalkyl radical, and $R^2$ is a hydrogen atom, an amino group or a lower alkyl or aryl radical, and X is oxygen or sulphur, produces synthetic penicillins useful by reason of their effectiveness against a variety of Gram-positive and Gram-negative bacteria.

10 Claims, No Drawings

THIAZOLE PENICILLINS

This is a continuation of application Ser. No. 1,019, filed Jan. 6, 1970.

This invention relates to new synthetic penicillins having antibiotic activity against micro-organisms in particular gram-positive activity, to a process for the preparation thereof and to pharmaceutical compositions containing the penicillins.

The new synthetic penicillins provided by the present invention are compounds of the following formula:

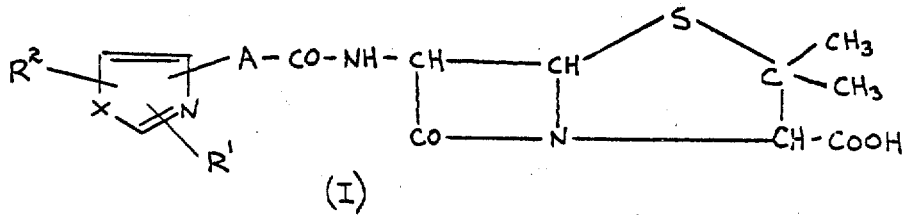

and salts thereof in which A is a lower alkylene radical containing from 1 to 4 carbon atoms, $R^1$ is an aryl radical (which may be a heterocyclic aryl radical) or a cycloalkyl radical, $R^2$ is a hydrogen atom, an amino group or a lower alkyl or aryl radical (which may be a heterocyclic aryl radical) and X is oxygen or sulphur; provided that where A is a methylene group, $R^2$ is an aryl or heterocyclic aryl radical. It is to be understood that the aryl radicals can be substituted or unsubstituted and may be carbocyclic radicals (e.g., phenyl or naphthyl radicals) or monocyclic heteroaryl radicals. Furthermore the compounds can be in the form of salts, either as salts of the acid or as acid addition salts. It is also to be understood that one of the three substituents in the thiazole ring is in the 2-position, one is in the 4-position and one is in the 5-position.

The novel compounds of the above general formula can be prepared using methods known per se for preparing penicillins. In general, the compounds may be prepared by coupling 6-aminopenicillanic acid (hereinafter referred to as 6-APA) or a salt or silyl derivative thereof with an acid of the general formula

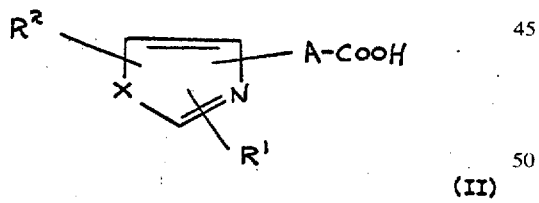

or a reactive derivative thereof. The acid of general formula (II) generally is reacted in the form of a halide (e.g., the chloride) or anhydride with 6-APA. However, other methods of forming penicillins known in the art can be used. If an anhydride is used then it may be a mixed anhydride if desired, but preferably the chloride of an acid of general formula (II) is reacted with 6-APA in the presence of a base. Generally temperatures of from −5°C up to 40°C or preferably temperatures of 0°–20°C have been found to be very suitable. The temperature will depend in any instance on the particular reactants used and of course should not be so high that decomposition of the product occurs.

The reactants employed in the foregoing reactions either are known compounds, which are commercially available or can be prepared by methods known in the art, or are derivatives thereof which can be prepared by well-known chemical procedures from appropriate starting materials following the methods described in the art for the known compounds. For example, many of the thiazoles of the above formula and their preparation are described in U.K. Patent Specifications Nos. 1,099,389, 1,145,884 and 1,147,626 and Belgian Pat. Nos. 722,290 and 722,458 and co-pending U.K. Patent Application No. 48640/67 (Belgian Pat. No. 722,290). Many of the oxazoles of the above general formula are described in co-pending U.K. Patent Application Nos. 56203/66, 27382/67 and 37598/67 (cognated as Belgian Pat. No. 713,392) and 48641/67 (Belgian Pat. No. 722,458). Netherlands Patent Application No. 67/13229 (corresponding to U.K. Pat. No. 1,139,940) also describes some of the oxazoles.

Generally the oxazoles or thiazoles are prepared by cyclising one or more reactants appropriately substituted by the three substituents shown in formula (II), or by substituents convertible to these substituents as after processes, and if necessary carrying out an after process. Examples of such processes include:

a. reacting a compound of general formula

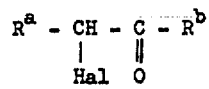

with a compound of general formula

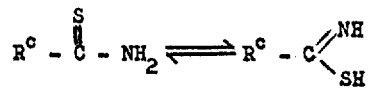

b. treating a compound of general formula

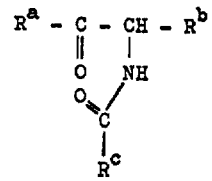

with a sulphur donating agent such as phosphorus pentasulphide c. reacting a compound of general formula

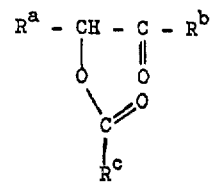

with a nitrogen donating agent such as ammonia, an ammonium salt or urea d. reacting a compound of general formula

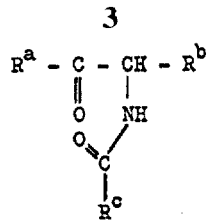

with a cyclising agent such as sulphuric acid, phosphorus pentachloride, phosphoryl chloride or phosphorus pentoxide e. reacting a compound of general formula

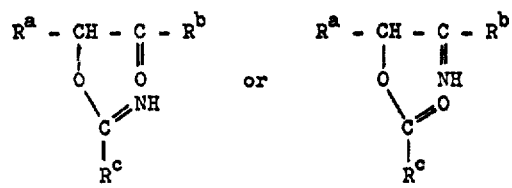

with an acid such as sulphuric acid f. reacting a compound of general formula

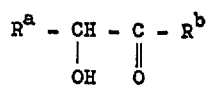

with a nitrile of formula $R^c.CN$ g. reacting a compound of general formula

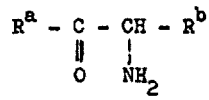

with one of general formula

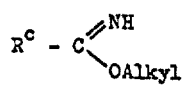

h. reacting a compound of general formula

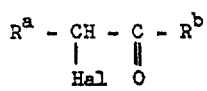

with one of formula $R^c.CO.NH_2$ or its salt or i. reacting a compound of general formula

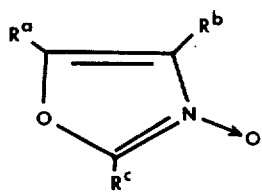

with a reducing agent, where in each of reactions (a) to (i) $R^a$, $R^b$ and $R^c$ are chosen in any order from $R^1$, $R^2$ and the residue —A—COOH or a precursor of such a residue.

As suitable after process where the heterocycle forming reaction utilises a precursor of —A—COOH are:

i. reacting a haloalkyl group with an alkali metal cyanide and hydrolysing the nitrile to the acid.

ii. reacting a haloalkyl group with a malonic diester and hydrolysing the product.

iii. reacting a carboxy group successively with (a) a halogenating agent, (b) diazomethane and (c) water in the presence of silver oxide (Arndt-Eistert reaction).

iv. hydrolysing an ester, nitrile or amide group.

v. a hydroxymethyl radical or halomethyl radical is oxidised to a formyl radical which is condensed with malonic acid or a malonic ester by a Knoevenagel reaction.

vi. an acrylic acid residue is reduced to a propionic acid residue by catalytic hydrogenation.

A preferred group of compounds of general formula (I) are those obtained by reacting 6-APA with thiazol-4-ylacid halide of the general formula

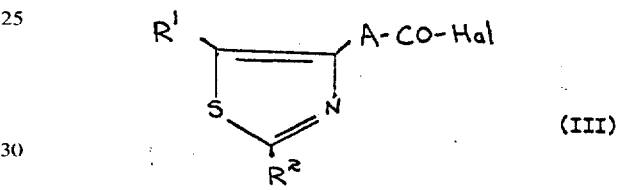

or an addition salt thereof, wherein $R^1$ and $R^2$ and A have the meanings defined above and Hal is a halogen atom, preferably a chlorine atom. The thiazoles of general formula (III) generally can be prepared by reacting a compound of the general formula

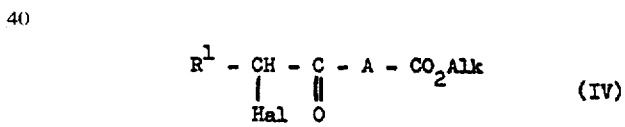

with a thioamide of the formula

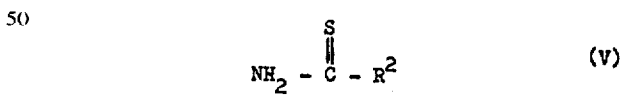

and converting the product to the acid halide (where $R^1$, $R^2$ and Hal have the meanings defined above and Alk is an alkyl radical preferably an ethyl radical). The compounds of general formula (IV) may be prepared by halogenating (e.g. brominating) the corresponding unhalogenated compounds, which may themselves be prepared in a manner known per se [see for example *J. Chem. Soc.* (1957), 3483 and *J. Amer. Chem. Soc.* 66, 1287, (1944)].

A second preferred group of compounds of the above general formula (I) are those obtained by reacting 6-APA with a thiazol-5-ylacid halide of the general formula

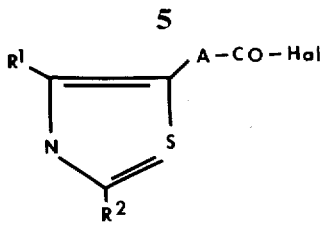

(VI)

(wherein $R^1$, $R^2$, A and Hal have the meanings defined above). The thiazoles of general formula (VI) generally can be prepared by reacting a compound of general formula

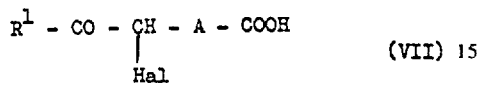

(VII)

with a thioamide of general formula (V) and converting the product to the acid halide. The compounds of general formula (VII) may be prepared by halogenating (e.g., brominating) the reaction product of a Friedel-Crafts reaction between optionally substituted aromatic (or heterocyclic) hydrocarbons and appropriate anhydrides. The thioamides of general formula (V) are known compounds or can be prepared in a manner known per se.

In the above formulae the radical A is a lower alkylene radical and preferably is a methylene, ethylene or trimethylene radical but it is to be understood that when the radical contains 2 or more carbon atoms it can cause the chain —A—CO— to be branched instead of being straight chained. Generally, preferred compounds are those having A as an ethylene radical.

$R^1$ may for example be phenyl, phenyl substituted by halogen, lower alkyl, lower alkoxy, trifluoromethyl or nitro, or can be a naphthyl radical or monocyclic heteroaryl or cycloalkyl radical having 4 to 7 carbon atoms in the ring. Examples $R^1$ are phenyl, chlorophenyl, bromophenyl, fluorophenyl, trifluoromethylphenyl, tolyl or methoxyphenyl, particularly where the substituent is in the p-position, cyclohexyl, 1- or 2- naphthyl, 2- or 3- thienyl, 2- or 3- furyl or 2-, 3- or 4- pyridyl. $R^2$ may be hydrogen, amino, methyl, ethyl or one of the radicals specified for $R^1$.

A preferred group of oxazole compounds of general formula (I) are those obtained by reacting 6-APA with an oxazol-2-ylacid halide of the general formula

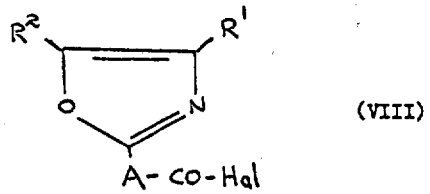

(VIII)

wherein $R^1$, $R^2$ and A have the meanings defined above and Hal is a halogen atom, preferably a chlorine atom. The oxazoles of general formula (VIII) generally can be prepared following Davidson's synthesis by reacting a ketoester of general formula

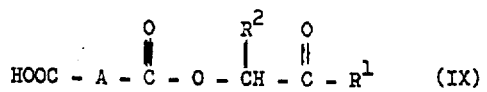

(IX)

or suitable derivative thereof (in which $R^1$, $R^2$ and A have the meanings defined above) with ammonia, an ammonium salt or urea and converting the oxazol-2-ylacid formed to its acid chloride, e.g., by reaction with thionyl chloride. The reaction with urea or ammonia, which may be in the presence of glacial acetic acid, preferably is carried out by heating, e.g., under reflux. The starting material of general formula (IX) generally may be prepared by esterifying an α-hydroxy ketone of formula

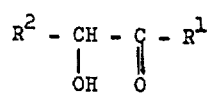

(in which $R^1$ and $R^2$ have the meanings defined above) with an anhydride of the appropriate dicarboxylic acid.

In the above formulae the radical A is a lower alkylene radical and preferably is a methylene, ethylene or trimethylene radical but it is to be understood that when the radical contains 2 or more carbon atoms it can cause the chain —A—CO to be branched instead of being straight chained. Generally, preferred compounds are those having A as an ethylene radical.

$R^1$ may for example be phenyl, phenyl substituted by halogen, lower alkyl, lower alkoxy, trifluoromethyl or nitro, or can be a naphthyl radical or monocyclic heteroaryl radical or a cycloalkyl radical having 4 to 7 carbon atoms in the ring. Examples of $R^1$ are phenyl, chlorophenyl, bromophenyl, fluorophenyl, trifluoromethylphenyl, tolyl or methoxyphenyl particularly where the substituent is in the p-position, cyclohexyl, 1- or 2- naphthyl, 2- or 3- thienyl, 2- or 3- furyl or 2-, 3-, or 4- pyridyl. $R^2$ may be hydrogen, amino, methyl, ethyl or one of the radicals specified for $R^1$.

The compounds of formula (I) and their salts, show good antibacterial activity against bacteria particularly against gram-positive micro-organisms such as *Staphylococcus aureus*, *Streptococcus pyogenes* and *Streptococcus faecalis* and also against *Neisseria catarrhalis* which is gram-negative. They frequently show activity against penicillin resistant strains of such micro-organisms. The invention therefore also provides a pharmaceutical composition comprising a compound of the above general formula (I), or a salt thereof, and a pharmaceutical carrier. The pharmaceutical carrier can be any of those carriers known in the art and may for example be solid or liquid. The compositions can be in the form of tablets, capsules or solutions.

If a salt is used instead of the free acid, the salt may be an alkali metal salt (e.g., a sodium or potassium salt), ammonium salt, an acid addition salt (for example a hydrochloride, sulphate or fumarate) or a salt with an amine or diamine base for example with a N,N'-disubstituted alkylene diamine such as N,N'-dibenzylethylene diamine.

When testing for the antibiotic activity, stock solutions of the compounds of general formula (I) were made up and incorporated in agar. The hardened surface was inoculated with various test micro-organisms and the agar incubated for 18 hours at 35°C. The minimum inhibitory concentration was measured, this being the amount that completely inhibits the test microorganism. Minimum inhibitory concentrations for a variety of micro-organisms are given for compounds of the invention in the following table.

TABLE

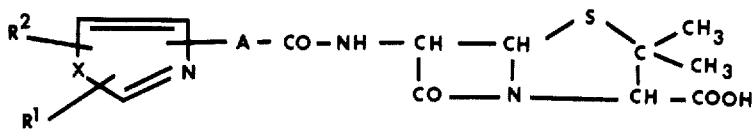

| R¹ | R² | A | (position) | X | salt | Str.pyogenes NCTC 2297 | Str.faecalis NCTC 370 | S.aureus 6538P | S. aureus Smith | N. catarrhalis 8193 |
|---|---|---|---|---|---|---|---|---|---|---|
| 4-phenyl | 2-(4-chlorophenyl) | —CH₂—CH₂— | 5 | S | a | 0.244 | 0.976 | 0.061 | 0.488 | 1.95 |
| 2-(4-chlorophenyl) | 5-H | —CH₂—CH₂— | 4 | S | a | 1.95 | 1.95 | 0.061 | | |
| | | | | | b | 1.95 | 1.95 | 0.061 | 0.061 | 3.90 |
| 4-phenyl | 2-H | —CH₂—CH₂— | 5 | S | c | 0.976 | 0.976 | 0.122 | | |
| | | | | | b | 0.488 | 0.488 | 0.122 | 0.122 | 0.976 |
| 4-phenyl | 2-NH₂ | —CH₂—CH₂— | 5 | S | a | 0.488 | 0.488 | 0.122 | 0.122 | 0.976 |
| 2-phenyl | 5-H | —CH₂—CH₂— | 4 | S | b | 1.95 | 1.95 | 0.122 | 0.122 | 7.81 |
| 4-(4-chlorophenyl) | 2-(4-chlorophenyl) | —CH₂—CH₂— | 5 | S | b | 0.244 | 0.488 | 0.122 | 0.244 | 1.95 |
| 4-(4-chlorophenyl) | 2-phenyl | —CH₂—CH₂— | 5 | S | b | 0.488 | 0.976 | 0.244 | 0.244 | 1.95 |
| 2-(4-chlorophenyl) | 5-H | —(CH₂)₃— | 4 | S | c | 0.976 | 0.976 | 0.061 | 0.122 | 1.95 |
| 2-phenyl | 5-phenyl | —CH₂— | 4 | O | b | 1.95 | 3.9 | 0.488 | 0.488 | 7.81 |
| 4-(4-chlorophenyl) | 5-H | —CH₂—CH₂— | 2 | O | b | 1.95 | 3.9 | 0.061 | 0.122 | 1.95 |
| 4-phenyl | 2-methyl | —CH₂—CH₂— | 5 | S | b | 0.122 | 0.244 | 0.244 | 0.244 | 0.976 |
| 2-cyclohexyl | 5-H | —CH₂—CH₂— | 4 | S | a | 3.9 | 7.8 | 0.122 | 0.122 | 7.81 |
| cloxacillin | | | | | | 15.6 | 15.6 | 0.488 | 0.488 | 62.5 |
| 2-phenyl (French Patent 1,556,818) | 5-H | —CH₂— | 4 | S | a | 62.5 | 62.5 | 1.95 | 1.95 | 62.5 | a = free acid
b = N,N'-dibenzylethylenediamine salt
c = sodium salt

The table shows that in general the compounds of the invention are more active than cloxacillin against the above micro-organisms and also more active than 6-(2-phenyl-thiazole-4-yl)-acetamido penicillanic acid (French Pat. No. 1,556,818).

When the compounds of this invention are employed as antibiotic agents they may be administered to warm-blooded animals (e.g., mice, rats, rabbits, dogs, cats or monkeys), alone or in combination with pharmacologically acceptable carriers, the proportion of which is determined by the solubility and chemical nature of the compounds, chosen route of administration and standard biological practice. For example, they may be administered orally in the form containing such excipients as starch, milk or sugar. They may also be administered orally in the form of solutions of they may be given parenterally. For parenteral administration they may be used in the form of a sterile solution or suspension containing other solutes, for example enough saline or glucose to make the solution isotonic.

The dosage of the present agents will vary with the form of administration and the particular compound chosen. Furthermore, it will vary with the particular subject under treatment. In general, the compounds of this invention are most desirably administered at a concentration level that will generally afford effective results without causing any harmful or deleterious side effects.

The following non-limiting Examples illustrate the invention:

EXAMPLE 1

6-(2,4-Diphenylthiazol-5-ylacetamido)penicillanic acid 2,4-Diphenylthiazol-5-ylacetic acid (5g.) prepared as described in U.K. Specification No. 1,145,884, was dissolved in the minimum volume of warm ethanol, the solution made strongly acid with ethanolic hydrochloric acid and ether was added to cause crystallisation of the hydrochloride of the starting material. This hydrochloride was dissolved in thionyl chloride (2.0 ml.), stirred at room temperature for 15 minutes and then heated in a water-bath at 45°C for half an hour. The solution was evaporated to dryness to give the acid chloride hydrochloride of the starting material as a dark tar. IR showed presence of —COCl group.

This acid chloride in dry acetone was added to a stirred ice-cooled solution of 6-APA (1.15 g.) and sodium bicarbonate (1.76 g.) in water (15 ml.) and acetone (10 ml.) over a period of 15 minutes. After stirring for one hour at 5°C the solution was filtered and the filtrate was separated from acetone using a rotary dryer.

After bringing to a pH of 2 with 1N hydrochloric acid, the reaction mixture was extracted into ether and the ether solution extracted with aqueous sodium bicarbonate. Further extraction with ether and sodium bicarbonate followed by drying yielded a brown solid. This was dissolved in water, adjusted to pH 2 with 1N HCl and extracted into ether and dried. A small amount of a 2N solution of potassium 2-ethylhexanoate in n-butanol was added to form the potassium salt dihydrate of the title compound. This was filtered, washed with ether and dried to give a pale brown solid (302 mg.).
Analysis: Found: C, 54.8; H, 4.0.
Calculated for $C_{25}H_{22}N_3O_3S_2K.2\ H_2O$: C, 54.4; H, 4.75%.

This compound showed anti-bacterial activity against *Bacillus subtilis* and *Staphylococcus aureus* including both penicillin sensitive and penicillin resistant strains.

EXAMPLE 2

6-[3-(2-Amino-4-phenylthiazol-5-yl)-propionamido]-penicillanic acid a. A mixture of 4-bromo-4-benzoylbutyric acid (obtained by brominating the corresponding non-halogenated acid) (5.42 g.) and thiourea (1.52 g.) in dimethylformamide (10 ml.) was heated at 65°C for 1 hour with stirring and poured into water (200 ml.) containing sodium carbonate (1.06 g.) to precipitate a solid product which was filtered and dried to give 4.6 g. of 3-[2-amino-4-phenylthiazol-5-yl]-propionic acid hemihydrate of m.p. 102°–104°C.

b. This acid (3.5 g.) in hot ethanol was treated with ethanolic hydrogen chloride. Ether was added and the reaction mixture cooled until crystallisation commenced. This product was collected and dried to give 3.53 grams of light brown crystals of the acid hydrochloride. The acid hydrochloride (1.6 g.) and thionyl chloride (1.5 ml.) were heated under reflux at 50°–70°C for 40 minutes to yield the acid chloride hydrochloride.

c. This product in dry acetone was added to a stirred ice-cooled solution of 6-APA) 1.08 g.) and sodium bicarbonate (1.68 g.) in water (15 ml.) and acetone (10 ml.) over a period of twenty minutes. After stirring for half an hour at 0°C and 1 hour at room temperature the title compound was obtained. This was filtered and washed with a little acetone to give 1.7 g. of the desired product as its dihydrate.
Analysis: Found: C, 51.2; H, 4.9; N, 11.45.
Calculated for $C_{20}H_{22}N_4O_4S_2.2H_2O$: C, 51.01; H, 5.3; N, 11.3.

This compound showed anti-bacterial activity against gram-positive micro-organisms in particular against *Bacillus subtilis*, *Staphylococcus aureus* and *Streptococcus pyogenes*. It was more active than cloxacillin against the following micro-organisms: *Staphylococcus aureus* (sensitive) strains ATCC 9144, WBS 183 and Smith, and against *Streptococcus pyogenes* NCTC 2297, *Streptococcus faecalis* NCTC 370 and *Diplococcus pneumoniae* NCTC 7465.

EXAMPLE 3

6-[3-(2-[4-Chlorophenyl]-4-phenylthiazol-5-yl)propionamido]-penicillanic acid 2-(4-Chlorophenyl)-5-phenylthiazol-4-ylpropionic acid (3.4 g.) prepared as described in U.K. Specification 1,145,884 and thionyl chloride (2 ml.) were refluxed for five minutes and evaporated to give a yellow oil which crystallised, whereby the acid chloride hydrochloride of the starting material was obtained.

This product in dry acetone (40 ml.) was added dropwise to a stirred ice-cooled solution of 6-APA (2.15 g.) and sodium bicarbonate (3.4 g.) in water (30 ml.)/acetone (20 ml.). Stirring was continued for half an hour at 0°C and then half an hour at room temperature. The reaction mixture was filtered, the filtrate concentrated to remove acetone and the solid formed was separated. Water was aadded and the pH adjusted to 2 with 2N hydrochloric acid. After extracting with sodium bicarbonate, adding ether and adjusting to pH 3 a solid separated, and was filtered off and dried to give 2.58 grams of the title compound of m.p. 156°–158°C.
Analysis: Found: C, 57.3; H, 4.6; N, 7.75.
Calculated for $C_{26}H_{24}Cl\ N_3O_4S_2$: C, 57.6; H, 4.5; N, 7.75%.

This compound showed anti-bacterial activity against gram-positive micro-organisms especially against *Bacillus subtilis*, *Staphylococcus aureus* and *Streptococcus pyogenes*. In particular the compound appeared more active than benzyl penicillin against *Streptococcus pyogenes* WBS 153 and more active tham ampicillin against *Staphylococcus aureus* resistant strains WB 131, WB 132, WB 110 and WB 111. It was more active than cloxacillin against *Staphylococcus aureus* WB 69 (penicillin sensitive), *Streptococcus pyogenes* NCTC 2297 and *Streptococcus faecalis* NCTC 370.

EXAMPLE 4

6-[3-(4-Phenylthiazol-5-yl)propionamido]penicillanic acid

Phosphorus pentasulphide (18 g.) and formamide (30 g.) in anhydrous ether (300 ml.) were stirred at room temperature for 24 hours and the ether solution decanted off. 140 ml. of this solution were added to 4-bromo-4-benzoylbutyric acid and allowed to stand for one week at room temperature. Ether was decanted off and the residual oil and crystals dissolved in ethanol, adjusted to pH 5 with 3% sodium bicarbonate and filtered. The precipitate obtained was dried to give 6.0 g. of 4-phenylthiazol-5-yl propionic acid.

This acid (2.3 g.) and thionyl chloride (2.0 ml.) were mixed at room temperature and left until the initial reaction had subsided. They were then heated at 50°C for half an hour and the solution evaporated to give the acid chloride hydrochloride.

This product (587 mg.) in dry ethanol-free chloroform (15 ml.) was added dropwise to a stirred ice-cooled suspension of 6-APA (438 mg.) in dry ethanol-free chloroform (5 ml.) and triethylamine (0.86 ml.) Stirring was continued for one hour at room temperature and the reaction mixture was then brought to pH 1 with 1N hydrochloric acid. The product was separated, washed with chloroform and water, stirred with 3% sodium bicarbonate until the pH was 7.5 and the aqueous layer was separated. The water was removed by gentle evaporation and dried to give the sodium salt dihydrate of the title compound as a brown solid (612mg).
Analysis: Found: C, 49.0; H, 4.7; N, 8.5.
Calculated for $C_{20}H_{20}N_3O_4S_2Na.\ 2H_2O$: C, 49.1; H, 4.95; N, 8.6%.

This compound showed anti-bacterial activity against gram-positive micro-organisms particularly *Bacillus subtilis*, *Staphylococcus aureus* and *Streptococcus pyogenes*. In particular the compound showed far higher activity than benzyl penicillin against *Staphylococcus aureus* (penicillin resistant strains) WB 96 and WB 154. It also had a higher activity than cloxacillin against *Staphylococcus aureus* resistant strains WB 156 and WB 160 and against *Strepto-* coccus pyogenes NCTC 2297 and *Streptococcus faecalis* NCTC 370.

EXAMPLE 5

6-[3-(2-[4-Chlorophenyl]thiazol-4-yl)propionamido]-penicillanic acid

β-[2-(4-Chlorophenyl)thiazol-4-yl]propionic acid (1.4 g.) prepared as described in Belgian Pat. No. 722,290, in $SOCl_2$ (2 ml.) was heated on a steam bath for 5 minutes, then cooled, evaporated, benzene added and evaporated again to give the acid chloride hydrochloride.

This was suspended in dry acetone (50 ml.) and added to a stirred ice-cooled solution of 6-APA (2.15 g.) and sodium bicarbonate (3.36 g.) in water (30 ml.) and acetone (20 ml.). After stirring for one-half hour at 0°C and then 1½ hours at room temperature, the acetone was removed and the residue filtered. The filtrate was brought to pH 4 with 2N hydrochloric acid and the precipitate was collected, washed with water and dried to give a white solid (2.03 g.) of the title compound monohydrate.

Analysis: Found: C, 49.6; H, 4.6; N, 8.7.
Calculated for $C_{20}H_{20}Cl\ N_3O_4S_2 \cdot H_2O$: C, 49.9; H, 4.1; N, 8.2%.

This compound showed anti-bacterial activity against gram-positive micro-organisms, especially *Bacillus subtilis*, *Staphylococcus aureus* and *Streptococcus pyogenes*. In particular, it was more active than benzyl penicillin against *Bacillus subtilis* ATCC 9466 and *Staphylococcus aureus* (penicillin sensitive strain) NCIB 8224.

In the above Examples NCIB stands for National Collection of Industrial Bacteria, WB for Wyeth Bacteria Collection, Havant, NCTC for National Collection of Type Cultures and ATCC for Americal Type Culture Collection.

EXAMPLE 6

Other compounds of general formula I can be prepared following the procedure of Examples 1 to 5 but replacing the thiazole by another thiazole or oxazole of general formula (II).

Furthermore, the benzathine (i.e., the N,N′-dibenzylethylenediamine) salt of the compounds of formula (I), can be prepared by reacting a penicillin prepared according to the Examples e.g., the penicillin of Example 4 or Example 7 with the diamine.

Pharmaceutical composition can be prepared from the penicillin provided by the invention, following the information given herein. For example tablets, capsules or sterile solutions or suspensions can be prepared

EXAMPLE 7

6-[3-(4,5-Di-[4-methoxyphenyl]oxazol-2-yl)propionamido]penicillanic acid 3-(4,5-Di-[4-methoxyphenyl]oxazol-2-yl)propionic acid (3.53 g.) and purified thionyl chloride (2.0 ml.) were heated at 100°C. for 5 minutes. After cooling, evaporating, adding benzene and evaporating again, the residue was dissolved in dry acetone (14 ml.) and added slowly dropwise to a stirred ice-cooled solution of 6-APA (2.15 g.) and sodium bicarbonate (3.36 g.) in water (30 ml.) and acetone (20 ml.). Stirring was continued for one hour at 0°C and then half an hour at room temperature. After filtration, the filtrate was concentrated to remove acetone, brought to pH 3.5 with 2N hydrochloric acid and extracted with ether. The ether extracts wer extracted with 3% sodium bicarbonate solution and the aqueous extracts brought to pH 4 with 2N hydrochloric acid. The precipitated solid was collected, washed and dried at room temperature to give 1.21 g. of light brown solid. This was dissolved in ethyl acetate, filtered and a 2N solution of potassium 2-ethylhexanoate in n-butanol (1.0 ml.) was added. Ether was added and the resultant precipitate filtered off, washed with ether and dried to give the hydrated potassium salt of the title compound as a pale yellow solid (830 mg.). IR spectra fully supported the structure assigned to the compound.

This compound showed anti-bacterial activity, against gram-positive micro-organisms, particularly against *Bacillus subtilis*, *Staphylococcus aureus* and *Streptococcus pyogenes*.

EXAMPLE 8

6-[3-(4-Phenylthiazol-5-yl)propionamido]penicillanic acid

4-Phenylthiazol-5-ylpropionic acid (5.24 g.) was converted to the acid chloride as in Example 4, suspended in dry acetone, and added to a stirred and ice cooled mixture of 6-aminopenicillanic acid (6-APA) (4.86 g.) and sodium bicarbonate (7.55 g.) in water (67.5 ml.) and acetone (45 ml.). Stirring was continued for 30 minutes at 5°C and 30 minutes at 22°C, then the filtered solution was concentrated under reduced pressure at <30°C to remove acetone. Ethyl acetate was added to the stirred aqueous solution and it was brought to pH 2.5 with 2N hydrochloric acid. The organic layer was separated, dried and treated with N,N′-dibenzylethylenediamine (DBED) to precipitate the DBED salt dihydrate as a white solid (8.90 g.).

Analysis: Found: C, 58.8; H, 5.6; N, 9.8.
Calculated for $(C_{20}H_{21}N_3O_4S_2)_2 \cdot C_{16}H_{20}N_2 2H_2O$: C, 59.0; H, 5.8; N, 9.8%.

EXAMPLE 9

6-[3-(2-[4-Chlorophenyl]thiazol-4-yl)propionamido]-penicillanic acid

The penicillin free acid was prepared as described in Example 5 except that instead of filtering off the final precipitate, it was extracted into ethyl acetate. The dried solution was treated with N,N′-dibenzylethylenediamine (DBED) to precipitate the DBED salt dihydrate as a white solid.

Analysis: Found: C, 56.12; H, 5.16; N, 9.39.
Calculated for $(C_{20}H_{20}ClN_3O_4S_2)_2 \cdot C_{16}H_{20}N_2 \cdot 2H_2O$: C, 55.66; H, 5.34; H, 9.27%.

EXAMPLE 10

6-[3-(2-Phenylthiazol-4-yl)propionamido]penicillanic acid

Starting with 2-phenylthiazol-4-ylpropionic acid instead of 2-p-chlorophenylthiazol-4-ylpropionic acid, the title compound was prepared in the same way as in the foregoing example.

Analysis: Found: C, 59.20; H, 5.66; N, 9.90.
Calculated for $C_{40}H_{40}N_6O_8S_4 \cdot C_{16}H_{22}N_2 \cdot 2H_2O$: C, 59.02; H, 5.84; N, 9.84%.

EXAMPLE 11

6-[2-(2-[4-Chlorophenyl]thiazol-4-yl)acetamido]penicillanic acid

Starting with 2-p-chlorophenylthiazol-4-ylacetic acid instead of 4-phenylthiazol-5-ylpropionic acid, the DBED salt dihydrate of title compound was prepared in the same way as the product of Example 8 as a white solid, m.p. 169°–172°C.

Analysis: Found: C, 54.31; H, 4.60; N, 9.35.
Calculated for $C_{38}H_{34}Cl_2N_6O_8S_4.C_{16}H_{22}N_2.2H_2O$: C, 54.94; H, 5.12; N, 9.49%.

EXAMPLE 12

6-[2-(2-Phenylthiazol-4-yl)acetamido]penicillanic acid

Substituting 2-phenylthiazol-4-ylacetic acid for 2-p-chlorophenylthiazol-4-ylacetic acid in the foregoing example, the DBED salt of the title compound was obtained in exactly the same way, as a white solid. The salt was dissolved in sodium bicarbonate solution and brought to pH 2.6 with 2N hydrochloric acid to precipitate the penicillin free acid hemi-hydrate, as a white solid, m.p. 158°–161°C.

Analysis: Found: C, 53.86; H, 4.70; N, 9.10.
Calculated for $C_{19}H_{19}N_3O_4S_2.\frac{1}{2}H_2O$: C, 53.57; H, 4.74; H, 9.86.

EXAMPLE 13

6-[4-(2-[4-Chlorophenyl]thiazol-4-yl)butyramido]penicillanic acid a. Ethyl 6-bromo-5-oxohexanoate (4.74 g.) and p-chlorothiobenzamide (3.78 g.) were dissolved in ethanol (30 ml.) and kept at room temperature for 21 hours. Ether was added to induce crystallisation and ethyl 2-p-chlorophenylthiazol-4-ylbutyrate (6.26 g.) was filtered off. The ester was suspended in water (22 ml.) containing potassium hydroxide (4.2 g.) and refluxed until all dissolved (2 3/4 hours). The cooled solution was filtered and adjusted to pH 2.0 with 2N hydrochloric acid to provide 2-p-chlorophenylthiazol-4-ylbutyric acid (5.25 g.), m.p. 118°–120°C.

b. The acid (6.15 g.) in thionyl chloride (15 ml.) was kept at 50°C for 2 hours then evaporated to dryness. Benzene was added and evaporation was repeated. The residue suspended in dry acetone (160 ml.) was added to a stirred and ice-cooled mixture of 6-APA (3.1 g.) and sodium bicarbonate (6.9 g.) in water (60 ml.) and acetone (40 ml.). Stirring and ice-cooling were continued for 4 hours then the acetone was removed under reduced pressure <30°C and the aqueous residue was stirred with ether and brought to pH 2.6. The ether layer was treated with 3% sodium bicarbonate until the pH reached 7.0. The acid and base treatments were repeated once again then the aqueous solution was evaporated to dryness at <30°C to give the penicillin sodium salt hemi-hydrate (4.92 g.), m.p. 147°–157°C.

Analysis: Found: C, 49.93; H, 4.44; N, 7.71.
Calculated for $C_{21}H_{21}N_3ClNaO_4S_2.\frac{1}{2}H_2O$: C, 49.36; H, 4.34; N, 8.22%.

EXAMPLE 14

6-[2-(4-p-Chlorophenylthiazol-5-yl)-acetamido]penicillanic acid a. Thioformamide and 3-p-chlorobenzoyl-3-bromopropionic acid were heated together in dimethylformamide at 65°C for 1 hour. The solution was poured into water, and the precipitate filtered, washed and dried to give 4-p-chlorophenylthiazol-5-ylacetic acid, m.p. 210°–213°C.

b. This acid (2.54 g.) was treated with an excess of thionyl chloride for one hour at 50°C to give on evaporation of the thionyl chloride the acid chloride hydrochloride as an oil. (IR showed

This was dissolved in dry acetone (40 ml.) and added dropwise to an ice-cooled solution of 6-APA (2.16 g.) and sodium bicarbonate (3.4 g.) in water (30 ml.)/acetone (20 ml.), and stirred for ½ hour at 0°C and 2 hours at 20°C. The mixture was filtered, the acetone removed on the rotary evaporator at 30°C and the pH taken to 2.5 with 2N hydrochloric acid in the presence of ethyl acetate. The organic layer was separated, and when the aqueous layer had been twice extracted with ethyl acetate, the combined ethyl acetate fractions were treated with DBED, when the title compound as its DBED salt dihydrate precipitated, m.p. 150°–55°C.

Analysis: Found: C, 54.3; H, 4.8; N, 9.1.
Calculated for $(C_{19}H_{18}ClN_3O_4S_2)_2.C_{16}H_{20}N_2.2H_2O$: C, 55.0; H, 5.1; N, 9.5%.

EXAMPLE 15

6-[2-(4-Phenylthiazol-5-yl)acetamido]penicillanic acid

4-Phenylthiazol-5-ylacetic acid (5 g.) in hot ethanol was treated with ethanolic hydrogen chloride and, on cooling, the hydrochloride crystallised. This was treated as the acid in Example 14(b), to give the title compound as its DBED salt dihydrate (2.05 g.), m.p. 150°–55°C (decomp).

Analysis: Found: C, 58.7; H, 5.2; N, 9.5.
Calculated for $(C_{19}H_{19}N_3O_4S_2)_2.C_{16}H_{20}N_2.2H_2O$: C, 58.4; H, 5.6; N, 10.1%.

EXAMPLE 16

6-[3-(2,4-Di-p-chlorophenylthiazol-5-yl)propionamido]penicillanic acid 2,4-Di-p-chlorophenylthiazol-5-ylpropionic acid (0.21 g.) was treated as in Example 14(b) to give the title compound as its DBED salt dihydrate (0.23 g.), m.p. 153°–156°C.

Analysis: Found: C, 57.3; H, 4.72; N, 7.96.
Calculated for $(C_{26}H_{23}Cl_2N_3O_4S_2)_2.C_{16}H_{20}N_2.2H_2O$: C, 57.1; H, 4.9; N, 7.8%.

EXAMPLE 17

6-[3-(2-Phenyl-4-p-chlorophenylthiazol-5-yl)propionamido]penicillanic acid

2-Phenyl-4-p-chlorophenylthiazol-5-ylpropionic acid (1.7 g.) was treated as in Example 14(b), except that the final isolation of the penicillanic acid, and the precipitation of the title compound as its DBED salt monohydrate was carried out in ether and not in ethyl acetate. Yield: 0.8 g., m.p. 158°–162°C.

Analysis: Found: C, 61.2; H, 5.2; N, 8.2.
Calculated for $(C_{26}H_{24}ClN_3O_4S_2)_2.C_{16}H_{20}N_2.H_2O$: C, 60.8; H, 5.3; N, 8.35%.

EXAMPLE 18

6-[2-(2-o-Chlorophenylthiazol-4-yl)acetamido]penicillanic acid 2-o-Chlorophenylthiazol-4-ylacetic acid (2.54 g.) was treated as in Example 14(b) to give 3.68 g. of the title product as its DBED salt dihydrate, m.p. 175°–180°C.
Analysis: Found: C, 52.2; H, 4.2; N, 9.2.
Calculated for $(C_{19}H_{18}ClN_3O_4S_2)_2 \cdot C_{16}H_{20}N_2 \cdot 2H_2O$: C, 55.0; H, 5.1; N, 9.5%.

EXAMPLE 19

6-[2-(2-[p-Chlorophenyl]-5-phenylthiazol-4-yl)acetamido]penicillanic acid 2-(p-Chlorophenyl)-5-phenylthiazol-4-ylacetic acid (1.65 g.) was treated as in Example 14(b) to give 1.6 g. of the title compound as its DBED salt trihydrate, m.p. 163°–165°C.
Analysis: Found: C, 58.4; H, 4.8; N, 8.2.
Calculated for $(C_{25}H_{22}ClN_3O_4S_2)_2 \cdot C_{16}H_{20}N_2 \cdot 3H_2O$: C, 58.7; H, 5.2; N, 8.3%.

EXAMPLE 20

6-[2-(2-Phenyl-5-[p-chlorophenyl]thiazol-4-yl)acetamido]penicillanic acid

2-Phenyl-5-(p-chlorophenyl)thiazol-4-ylacetic acid (1.65 g.) was treated as in Example 14(b) to give 0.5 g. of the title compound as its DBED salt trihydrate, m.p. 164°–168°C.
Analysis: Found: C, 58.1; H, 4.7; N, 8.5.
Calculated for $(C_{25}H_{22}ClN_3O_4S_2)_2 \cdot C_{16}H_{20}N_2 \cdot 3H_2O$: C, 58.7; H, 5.2; N, 8.3%.

EXAMPLE 21

6-[3-(2-Methyl-4-phenylthiazol-5-yl)propionamido]penicillanic acid

Thioacetamide and 4-benzoyl-4-bromobutyric acid were treated as in Example 14(a) to give 2-methyl-4-phenylthiazol-5-ylpropionic acid of m.p. 157°–159°C. This was treated as in Example 14(b) to give the DBED salt dihydrate of the title compound, m.p. 100°C (decomp.). Analysis: Found: C, 59.7; H, 5.8; ; N, 9.2.
Calculated for $(C_{21}H_{23}N_3O_4S_2)_2 \cdot C_{16}H_{20}N_2 \cdot 2H_2O$: C, 59.7; H, 6.0; N, 9.6%.

EXAMPLE 22

6-[3-(2-Cyclohexylthiazol-4-yl)propionamido]penicillanic acid

2-Cyclohexylthiazol-4-ylpropionic acid hydrochloride was treated with an excess of thionyl chloride, then with 6-APA as in Example 14(b), but after removal of the acetone, the mixture was acidified with 2N hydrochloric acid, in the absence of ethyl acetate, to yield the title compound which was filtered, washed and dried. M.p. 83°–85°C. Analysis: Found: C, 54.7; H, 6.0; N, 9.0. Calculated for $C_{20}H_{27}N_3O_4S_2$: C, 54.9; H, 6.2; N, 9.6%.

EXAMPLE 23

6-[2-(2,5-Diphenyloxazol-4-yl)acetamido]penicillanic acid a. 2,5-Diphenyloxazol-4-ylacetic acid (0.545 g.) was warmed with excess thionyl chloride at 50°C for 0.25 hour, and the thionyl chloride and subsequent benzene washings were removed on the rotary evaporator, to give the acid chloride hydrochloride of the starting oxazole as an oil.

b. This oil was dissolved in dry acetone (10 ml.) and added dropwise to a stirred and ice-cooled solution of 6-APA (0.43 g.) and sodium bicarbonate (0.7 g.) in water (10 ml.) and acetone (7ml.), and then stirred for 2 hours at room temperature. The mixture was filtered, the acetone removed on the rotary evaporator at 30°C and the resulting solution acidified with 2N hydrochloric acid to pH 3 in the presence of ethyl acetate. The organic layer was separated from the aqueous, combined with two subsequent ethyl acetate extractions of the aqueous layer, dried, and on addition of DBED, the DBED salt dihydrate of the title compound crystallised (0.18 g.), m.p. 168°–173°C.
Analysis: Found: C, 64.3; H, 5.7; N, 8.8.
Calculated for $(C_{25}H_{23}N_3O_5S)_2 \cdot C_{16}H_{20}N_2 \cdot 2H_2O$: C, 64.4; H, 5.7; N, 9.1%.

EXAMPLE 24

6-[3-(4-[p-Chlorophenyl]xoazol-2-yl)propionamido]penicillanic acid

Prepared as in Example 14 using 4-p-chlorophenyloxazol-2-ylpropionic acid (1.02 g.), and twice the quantities quoted in that Example, to give 0.58 g. of the title compound as its DBED salt dihydrate, m.p. 140°–150°C.
Analysis: Found: C, 57.4; H, 5.4; N, 9.2.
Calculated for $(C_{20}H_{20}ClN_3O_5S)_2 \cdot C_{16}H_{20}N_2 \cdot 2H_2O$: C, 57.2; H, 5.5; N, 9.5%.

EXAMPLE 25

6-[3-(2-Ethyl-4-phenylthiazol-5-yl)propionamido]penicillanic acid

Thiopropionamide and 4-benzoyl-4-bromobutyric acid were tested as in Example 14(a) to give 2-ethyl-4-phenylthiazol-5-ylpropionic acid. Treatment of this as in Example 14(b) gave the DBED salt of the title compound.

EXAMPLE 26

6-[3-(2-Propyl-4-phenylthiazol-5-yl)propionamido]penicillanic acid

Thiobutyramide and 4-benzoyl-4-bromobutyric acid were reacted as in Example 14(a) to give 2-propyl-4-phenylthiazol-5-ylpropionic acid. This was converted into the DBED salt of the title compound by the method of Example 14(b).

EXAMPLE 27

6-[3-(2-Butyl-4-phenylthiazol-5-yl)propionamido]penicillanic acid

Thiovaleramide and 4-benzoyl-4-bromobutyric acid were treated as in Example 14(a) to give 2-butyl-4-phenylthiazol-5-ylpropionic acid, which was converted into the DBED salt of the title compound by the method of Example 14(b).

EXAMPLE 28

6-[2-(2-Phenyl-5-[p-bromophenyl]thiazol-4-yl)acetamido]penicillanic acid

2-Phenyl-5-(p-bromophenyl)thiazol-4-ylacetic acid was treated as in Example 14(b) to give the title compound as its DBED salt.

EXAMPLE 29

6-[3-(4,5-Di-[p-ethoxyphenyl]oxazol-2-yl)propionamido]penicillanic acid 3-(4,5-Di-[p-ethoxyphenyl]oxazol-2-yl)propionic acid was treated as in Example 7 to give the potassium salt of the title acid.

EXAMPLE 30

6-[3-(4,5-Di-[p-butoxyphenyl]oxazol-2-yl)propionamido]penicillanic acid 3-(4,5-di-[p-butoxyphenyl]oxazol-2-yl)propionic acid was converted into the potassium salt of the title acid by the procedure of Example 7.

EXAMPLE 31

6-[5-(2-[p-Chlorophenyl]thiazol-4-yl)valeramido]penicillanic acid 2-(p-Chlorophenyl)thiazol-4-ylvaleric acid was prepared from ethyl 7-bromo-6-oxoheptanoate and p-chlorothiobenzamide, and subsequently converted to the sodium salt of the title acid by the procedure of Example 13.

We claim:

1. A synthetic penicillin selected from those of the general formula

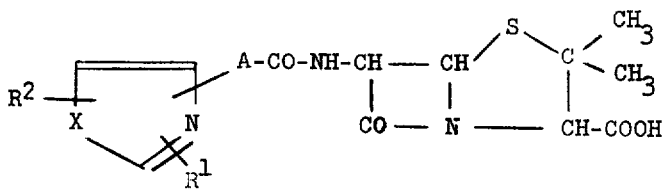

and their pharmaceutically acceptable salts wherein $R^1$ is a group selected from phenyl and chlorophenyl; $R^2$ is a group selected from hydrogen, amino, phenyl, chlorophenyl, and methyl; A is a lower alkylene chain selected from ethylene and trimethylene; and X is sulphur.

2. A compound according to claim 1 which is 6-[3-(2-Amino-4-phenylthiazol-5-yl)propionamido]penicillanic acid.

3. A compound according to claim 1 which is 6-[3-(2-[4-Chlorophenyl]-4-phenylthiazol-5-yl)propionamido]penicillanic acid.

4. A compound according to claim 1 which is 6-[3-(4-Phenylthiazol-5-yl)propionamido]penicillanic acid.

5. A compound according to claim 1 which is 6-[3-(2-[4-Chlorophenyl]thiazol-4-yl)propionamido]-penicillanic acid.

6. A compound according to claim 1 which is 6-[3-(2-Phenyl-thiazol-4-yl)propionamido]penicillanic acid.

7. A compound according to claim 1 which is 6-[3-(2,4-Di-[4-chlorophenyl]thiazol-5-yl)propionamido]-penicillanic acid.

8. A compound according to claim 1 which is 6-[3-(2-Phenyl-4-[4-chlorophenyl]thiazol-5-yl)propionamido]penicillanic acid.

9. A compound according to claim 1 which is 6-[4-(2-[4-Chlorophenyl]thiazol-4-yl)butyramido]penicillanic acid.

10. A compound according to claim 1 which is 6-[3-(2-Methyl-4-phenylthiazol-5-yl)propionamido]penicillanic acid.

* * * * *